United States Patent

[11] 3,630,005

| [72] | Inventor | Thomas V. Reinauer<br>Summit, N.J. |
|------|----------|-----|
| [21] | Appl. No. | 713,864 |
| [22] | Filed | Mar. 18, 1968 |
| [45] | Patented | Dec. 28, 1971 |
| [73] | Assignee | Slick Industrial Company<br>Summit, N.J. |

[54] VERTICALLY SECTIONED DUST COLLECTOR
17 Claims, 4 Drawing Figs.

[52] U.S. Cl. ............................................. 55/302,
55/341
[51] Int. Cl. ............................................ B01d 46/04
[50] Field of Search........................................ 55/284,
291, 293, 300, 301–303, 341, 96; 210/323, 333,
410, 411

[56] References Cited
UNITED STATES PATENTS

| 1,509,912 | 9/1924 | Stebbins | 55/303 |
| 2,804,168 | 8/1957 | Church | 55/302 |
| 2,964,129 | 12/1960 | Labbe | 55/293 |
| 3,095,289 | 6/1963 | Egan | 55/96 |
| 3,146,080 | 8/1964 | Ruble et al. | 55/96 |
| 3,158,455 | 11/1964 | Lincoln | 55/292 |
| 3,325,979 | 6/1967 | Smith | 55/302 |
| 3,375,641 | 4/1968 | Labbe | 55/293 |
| 3,383,840 | 5/1968 | Johnson et al. | 55/293 |
| 3,385,033 | 5/1968 | Bashore et al. | 55/302 |
| 1,163,318 | 12/1915 | Bryant | 55/293 |
| 2,145,049 | 1/1939 | Heuberger | 55/486 |

FOREIGN PATENTS

| 649,123 | 9/1962 | Canada | 55/302 |
| 651,008 | 3/1951 | Great Britain | 55/482 |

Primary Examiner—Frank W. Lutter
Assistant Examiner—Bernard Nozick
Attorneys—Albert C. Johnston, Robert E. Isner, Lewis H. Eslinger and Alvin Sinderbrand ABSTRACT: Apparatus for separating particulate matter from gaseous carriers formed of a plurality of discrete filter chambers disposed in vertical superposed relation interconnected by a vertically oriented conduit member that is constituted, at least in part, by permeable filter medium that forms a portion of the defining walls of each such chamber.

VERTICALLY SECTIONED DUST COLLECTOR

This invention relates to the separation of solid particulate matter from gaseous carriers and particularly to improved methods and apparatus for effecting the separation and collection of such particulate matter by passage of such gaseous carriers through permeable filter media.

Over the years many specific forms of apparatus have been proposed and constructed to achieve separation of solid particular matter from gaseous carriers by selective passage of the latter through permeable filter media together with many proposals for and constructions of apparatus and associated methods for maintaining the permeability of the filter medium by periodically effecting the removal therefrom of at least some of the solids that accumulate thereon, preferably without undue disturbance of the overall continuity of the separation operation. The most widely used conventional construction for apparatus of the above character utilized for commercial dust collection incorporates the use of pluralities of vertically disposed tubular filter socks and with periodic cleaning thereof being effected by shaking or agitation of the dust-laden bags or by reverse flow of gas therethrough or by a combination thereof. In the handling of large volumes of gas, the inherently possessed advantages of the efficient use of floor space and the efficient use of structural steel and associated structural enclosing elements have led to the widespread use of vertically oriented units of the type generally described above.

The ever increasing present day concern with air pollution and the pressure of continually rising costs have created a demand for dust collection apparatus of increased capacity, oftentimes with a capability of handling gaseous carriers of elevated temperatures, and the art has generally turned to vertically oriented units of increased height in their efforts to solve the problems presented. Unfortunately, however, such vertical extension presents problems of increasing, if not of accelerating, magnitude as the height of the units is increased. Among these problems, many of which are accentuated when high temperature gases are being handled, is a necessary increase in filter bag diameter as the bag length increases, an increased reliance upon spreader rings or other expedients to prevent bag collapse during cleaning, complication of the cleaning mechanisms due, at least in part, to the practical operational unsuitability of conventional cleaning techniques for bag lengths beyond about 25 to 30 feet because, inter alia, of the excessive amplitudes of bag displacement that then accrue and markedly increased operating stresses upon the filter bags, particularly at the terminal mounting locations thereof; generally shortened bag life, increased difficulty in handling and installing filter bags, increased difficulty in the obtaining and maintaining of proper bag tensions and an attendant general complication of structure of permit convenient access to the unit for maintenance and repair operations, all of which not only constitute a substantial counterbalance to the advantages inherent in vertically oriented units but cooperate to effectively lower the performance characteristics of the unit and to markedly increase the operating and maintenance expense thereof.

The invention also includes, in its broad aspects, the provision of an improved means for effecting the cleaning of vertically disposed filter media which includes means for of preferentially subjecting the lower portions of the filter media to an effectively greater quantity of cleaning. In its more narrow aspects the subject invention includes a plurality of discrete filter chambers disposed in vertical, superposed relation having a common vertically oriented dirty gas conduit, formed of coaxially disposed interconnected lengths of tubular filter medium and constituting an extension of the dirty gas feed conduit, passing therethrough and with the portions of said filter medium disposed within each said chamber forming a portion of the defining walls thereof. Also included is means for selectively subjecting the filter medium associated with each of said filter chambers to an independent cleaning operation without interruption of a continuous flow of gaseous carrier, in a preferred mode of operation, down through the vertically oriented dirty gas conduit toward a material collection hopper disposed at the lower end thereof.

Also included in such more narrow aspects of the invention is the provision of a novel improved means for cleaning such vertically superposed filter chambers wherein such chambers are subjected to an effective quanta of cleaning that varies inversely with their relative height and wherein, for example, the lowermost of said chambers is subjected to a greater quantum of cleaning than the chambers disposed thereabove.

Among the advantages of the subject construction is the permitted realization, for vertically oriented units of extreme height, of the advantages inherent in vertically oriented units with a concommitant minimization, if not effective avoidance, of most, if not all, of the above-named problems that have been heretofore attendant increases in height thereof. Among the same are included the permitted use of filter bags or socks of optimum character and length for any particular set of operating parameters with a concommitant increase in operational characteristics and decrease in installation and maintenance problems and the permitted utilization of different cleaning techniques for renewing the permeability of the filter medium. Still another advantage attendant the subject invention is the permitted utilization, in vertically oriented dust collection apparatus constructed in accord with the principles outlined herein of predetermined selected modes of operation for effecting cleaning of the filter medium, some of which, at least, effect a marked enhancement of the overall operating characteristics and capacity of the units.

The primary object of this invention is the provision of improved apparatus for effecting the separation of particulate matter from gaseous carriers.

Another primary object of this invention is the provision of an improved apparatus for a vertically oriented dust collector.

A still further object of this invention is the provision of improved apparatus for vertically oriented dust collectors.

Other objects and advantages of the subject invention will become apparent from the following portions of this specification and from the appended drawings which illustrate, in accord with the dictates of the patent statutes the essentials of presently preferred apparatus incorporating the principles of the invention.

Referring to the drawings.

Figures 1, 3:
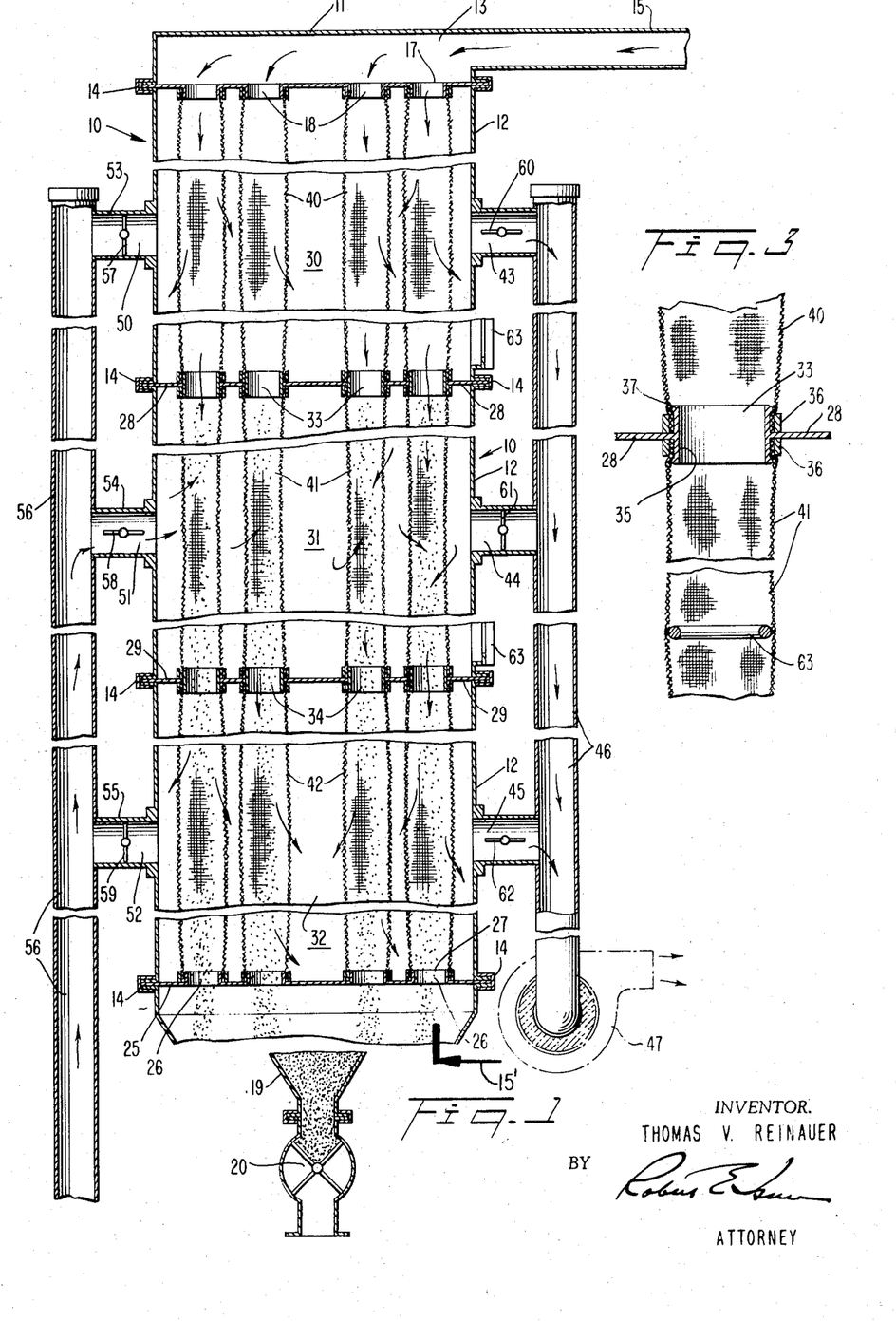
FIGS. 1 is a schematic vertical sectional view of a dust collector construction embodying the principles of this invention, as adapted to utilize a reverse-flow cleaning technique.
FIG. 3 is an enlarged sectional view of a portion of a tube sheet showing one means for mounting the ends of the filter bags thereto.
Figures 2, 4:
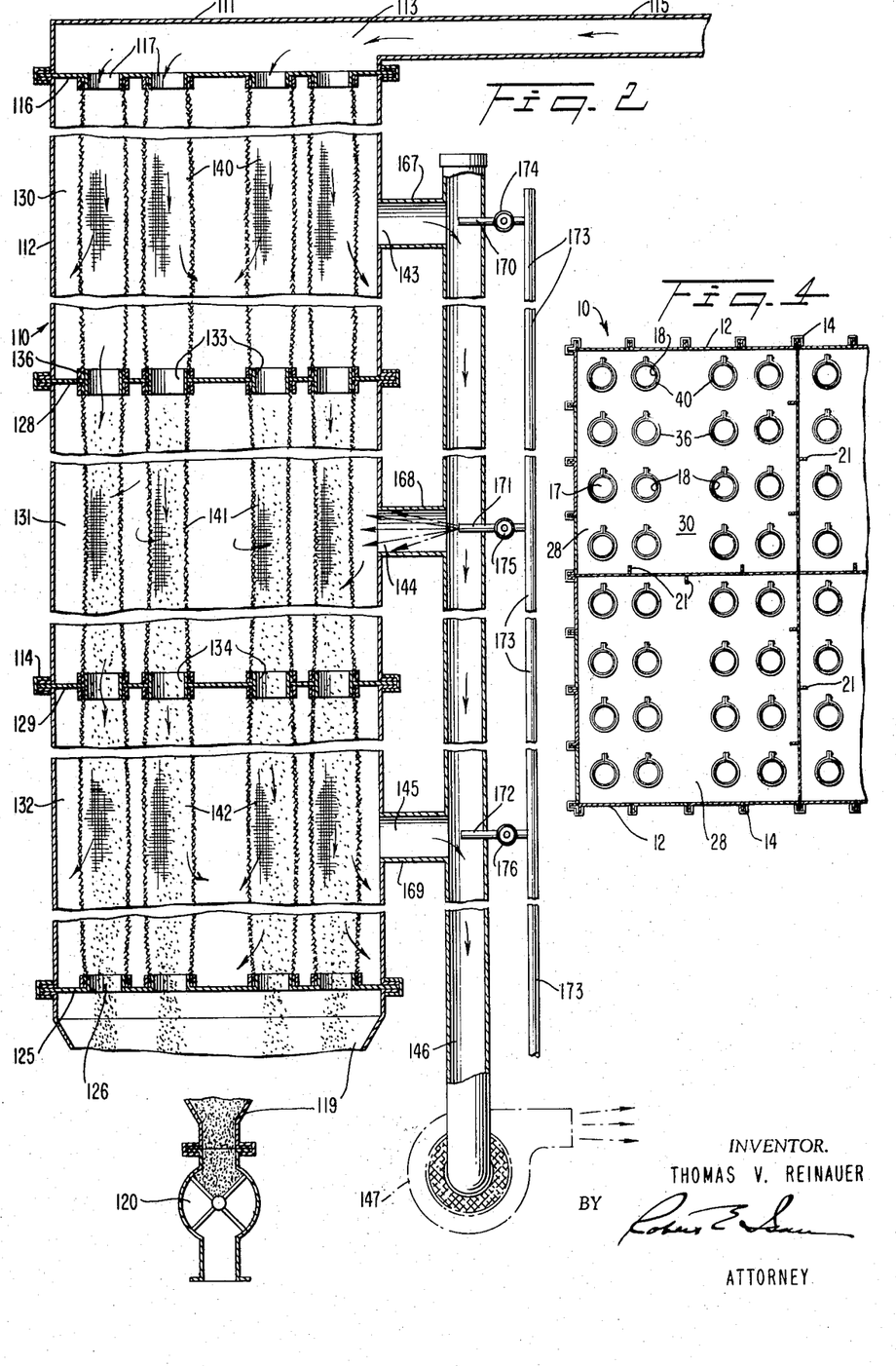
FIGS. 2 is a schematic vertical sectional view of a dust collector of the type shown in FIG. 1 as adapted to utilize pulse jet type of cleaning technique.
FIG. 4 is a horizontal sectional view as taken intermediate the tube sheets and illustrating the combining of modular sections thereof.

Referring initially to FIGS. 1 and 4 there is illustrated, in somewhat schematic form, a dust collector device incorporating the principles of this invention that includes an upright, elongate housing, generally designated 10, which may be of any convenient external configuration and suitably is of generally rectangular or cylindrical cross section. Conveniently, the outer housing 10 is constituted so as to be easily assembled in module like blocks from a plurality of uniformly sized flanged panels or segments, generally designated 12 which may be prefabricated in a plurality of standardized length and width dimensions. In a preferred construction, the mating flanges on the segments 12 are sized so as to be disposed, with associated gasket material, within U-shaped caps or clamping members 14 which, in association with auxiliary bolts or the like, cooperatively function to provide for an essentially airtight housing construction. Alternatively such housing can be fabricated of longer sections that are welded together. In all cases, however, the subject construction lends itself to appreciable degrees of prefabrication at ground level either at the erection site or at locations remote therefrom which not only permit economy of fabrication but markedly simplifies the problems, both as to equipment and personnel, of erecting the unit at the point of use.

The upper portion of the housing 10 terminates in a cap member 11 which defines, in cooperation with a transversely disposed upper tube sheet 16, an entry or dirty air plenum chamber 13 into which the gaseous carrier, usually air or the gaseous effluent from a furnace or the like, having the particulate matter entrained therein is introduced via the dirty gas entry conduit 15 foot of circular apertures 17 peripherally defined or bounded by dependent relatively short collar members 18.

The lower portion of the housing 10 terminates in a conically shaped hopper 19 having a rotary airlock type valve, generally designated 20, at the bottom thereof. The hopper 19, in conjunction with a transversely disposed lower tube sheet 25 incorporating a plurality of circular apertures 26 disposed in coaxial longitudinal alignment with the aperture 17, each peripherally defined or bounded by an upwardly directed relatively short collar member 27, defines a particulate matter receiving chamber.

Disposed intermediate the upper and lower tube sheets 16 and 25 respectively and in predetermined relation therewith and with each other are one or more transversely disposed intermediate tube sheets, as for example the tube sheets 28 and 29 in the exemplary illustrated three chamber structure. Any number of intermediate tube sheets may be employed in accord with the number of discrete filter chambers of selected dimension that will be required for any given installation. As is apparent, the number of discrete filter chambers formed will always be equal to the number of intermediate tube sheets plus one and, as an example, the inclusion of four intermediate tube sheets will result in the formation of five discrete filter chambers disposed in vertical superposed relation.

Each of the intermediate tube sheets 28 and 29 is provided with complementally sized apertures 33 and 34 disposed in coaxial longitudinal alignment with the corresponding apertures 17 and 26 respectively in the upper and lower tube sheets. As shown in enlarged scale in FIG. 3, each of the apertures 33 and 34 is peripherally defined or bounded by a short sleevelike collar 35 that extends both upwardly and downwardly from the plane of the tube sheet. Preferably the terminal edges thereof are selectively contoured to provide, for example, inwardly or outwardly directed beads 37 or the like so as to form a socketlike receptacle for clamping rings 36 or other filter media securing expedients. In the illustrated arrangement the external housing 10 in conjunction with each contiguous or adjacent pair of tube sheets serves to define, in part, a discrete filter chamber and such elements collectively serve to define, again in part, a plurality of such discrete filter chambers disposed in vertical superposed relation. In the illustrative example, the external housing 10 together with the tube sheets 16 and 28 serve to cooperatively define, in part, a first and uppermost filter chamber 30 disposed immediately above a second or intermediate filter chamber 31 that is cooperatively defined, again in part by the intermediate tube sheets 28 and 29 and the surrounding housing 10. In a similar manner the tube sheets 29 and 25 in association with the surrounding housing 10 define, in part, a third and lowermost discrete filter chamber 32. Each chamber desirably includes an access hatch 37.

Secured, as by clamping rings 36, to each pair of facing coaxially aligned collars 18, 33 in the tube sheets 16 and 28 respectively are the terminal end portions of a cylindrical filter bag or sock 40. The filter bags 40 may be constructed of any suitable permeable filter medium, preferably of a nonrigid character such as fabric, which may be of any fibrous material, either natural or synthetic spun into yarn and then woven or impacted, bonded or otherwise formed into a felt. The permeable media filter bags 40 thus so disposed intermediate the tube sheets 16 and 28 are in direct communication through the apertures 17 to the dirty gas entry plenum 13 and thereby serve to constitute, in conjunction with the aforesaid tube sheets 16 and 28 and the adjacent surrounding portions of the housing 10, a portion of the defining walls of the upper filter chamber 30 as well as an extension of the dirty gas conduit system. In a similar manner the filter socks 41, externally secured to the facing segments of the collars 33 and 34 intermediate the tube sheets 28 and 29 constitute extensions of the coaxially aligned filter socks 40 as well as a portion of the defining walls of the intermediate or second filter chamber 31. Likewise the filter socks 32 terminally secured to the facing segments of the collars 34 and 27 intermediate the tube sheets 29 and 25 constitute extensions of the coaxially aligned filter socks 40 and 41 as well as a portion of the defining walls of the lower or third filter chamber 32. As will now be apparent the subject construction results in vertically oriented dirty gas conduits of substantially uniform cross-sectional configuration and having a lineally continuous longitudinal axis.

Each of the discrete filter chambers 30, 31 and 32 is provided with a clean gas outlet vent, such as the vents 43, 44 and 45 respectively connected to a common clean gas exhaust line 46, through which, for example, gas may be drawn by a downstream fan 47 or the like. For convenience, each of the filter chambers will be desirably provided with an individual access door or the like together with associated structural accessories such as catwalks and ladders to facilitate entry thereto for maintenance operations.

In operation of the subject system, the gaseous carrier having the particulate matter entrained therein is introduced into the plenum 13 through the conduit 15 under a driving force which may be provided, for example, by the fan 47, or other prime mover, not shown, disposed downstream in the clean gas exhaust line 46. The dirty gas, i.e., the gaseous carrier together with the entrained particulate matter, is then diverted, in normal filtering flow, through the apertures 17 in the upper tube sheet 16 into the filter socks 40 which, as pointed out above, serve, in conjunction with the coaxially aligned filter socks 41 and 42, as extensions of the dirty gas conduit system. Under such normal flow conditions, a portion of the gaseous carrier will pass through the walls of the filter socks 40 and into and through the first filter chamber 30, leaving the particulate matter entrained therein on or in the permeable media. Concurrently therewith other portions of the gaseous carrier will continue moving downwardly and will pass through the filter socks 41 and 42 and into and through the second and third filter chambers 31 and 32 respectively. The direction of gas flow within the dirty gas portion of the illustrated system is always directed toward the material receiving hopper 19 and because of the apportioned removal of gaseous carrier through each of the discrete filter chambers 30, 31 and 32 the velocity of the gaseous carrier will be at a maximum immediately after passage through the apertures 17 in the upper tube sheet 16 and will decrease to substantially 0 in the vicinity of the apertures 26 in the lower tube sheet 25.

The above-described construction not only possesses the inherent space and metal savings advantages inherent in vertically oriented dust collection units but, because of its essentially modular or compartmentalized nature possesses the marked and further advantage of permitted assembly at ground level from a maximum number of basic components, i.e. standardized tube sheets and flanged structural segments that can be predesigned as to dimension and readily prefabricated. The concomitant ability to predimension and predesign the discrete filter chambers and the permitted mounting of pluralities of the same in vertical superposed relation effectively removes the height limitations heretofore attendant vertically oriented dust collectors. In fact, the subject construction appears to make possible overall heights which are limited only by such high velocities of the gaseous carrier as would create an undue abrasive action on the permeable filter media employed. By way of example, if it be estimated that the maximum downward velocity of the gaseous carrier bearing the entrained particulate matter that could be tolerated for a given filter medium should not exceed 1,000 feet per minute, such would, at an assumed gas to permeable media passage ratio of 2 cubic feet per minute per square foot of filter media, permit utilization of an effective total bag length in the neighborhood of 110 foot using conventional 11-inch diameter bags. Such heights are, of course, practically unattainable in conventional constructions but could be here easily attained by the vertical superposition of 11 discrete filter chambers, each of a height of 10 feet.

Experience to date has indicated that constructions which provide for entry of the dirty gas at the top of the unit and wherein the direction of dirty gas flow is always toward the material receiving hopper are clearly preferred. HOwever, the vertically superposed arrangement of discrete filter chambers as described above may also be utilized wherein the dirty gas is introduced at the bottom of the unit rather than the top and some of the advantages of the invention may be obtained in such type of installation.

As is well known, at least a portion of the solid particulate matter which collects on the upstream side of and in the permeable filter medium during the normal filtering flow operations as described above must be dislodged therefrom from time to time in order to maintain permeability of the filter medium at an acceptable level, i.e. at a level at which, under a given set of conditions of use, the overall dust collection unit or system is capable of performing its function at a desired rate of gas flow. Basically, dust collection systems are designed to either provide essentially continuous uninterrupted gas flow to and through the system, in which case the dislodging of the collected gas must be performed during this continuous operation, or to provide a programmed, and usually short term, stoppage of the gas stream during which stoppage the dislodging of the dust may be performed.

Among the advantages of the modular nature of the discrete and vertically superposed filter chambers of the subject invention is the permitted utilization, for each individual filter chamber, of cleaning operations of either of such types described above. That is, cleaning of the permeable media associated with each filter chamber may be effected with or without interruption of the flow through a particular filter chamber while normal filter operations are being continued in the remaining filter chambers, and moreover such cleaning may, because of the effectively short length of filter bags employed, utilize techniques that were not heretofore available for conventional vertically oriented units of any appreciable size. As such, the described construction provides a basic degree of flexibility in cleaning techniques that has not been heretofore attainable in vertical units of any appreciable size. More particularly stated, known cleaning techniques such as "reverse flow" cleaning and various types of "pulse-jet" cleaning can readily be incorporated and utilized to advantage. In the sue of such "pulse-jet" techniques, the operation of the units being subjected to cleaning are not mechanically interrupted or isolated from the remainder of the units of the assemblage. Instead, an abrupt burst of high energy gas is released countercurrent to the normal filter flow and over a cross-sectional area of an opening of a filter chamber thereby at once stopping and reversing normal filter flow and causing an abrupt pressure rise in the downstream face of the filter medium. Such pulse-jet method and cleaning technique utilizing either single pulses as disclosed in Church Reissue U.S. Pat. No. Re. 24,954 or a series of pulses of particular character to effect dislodgement of dust by a gas movement induced shaker type displacement of the filter media, as disclosed in U.S. Pat. No. 3,368,328, may be employed and incorporated in the subject apparatus.

By way of further example, the dust collector construction illustrated in FIG. 1 includes provision for selectively effecting reverse flow cleaning of the permeable filter media associated with each of the discrete filter chambers 30, 31 and 32. To the above end, each of the filter chambers 30, 31 and 32 is provided with an individual clean or backwash gas entry aperture as illustrated at 50, 51 and 52 connected by suitable conduit sections 53, 54 and 55 respectively to a common clean or backwash gas supply conduit 56. Disposed in each of the conduit sections 53, 54 and 55 are rotatably displaceable damper members 57, 58 and 59 respectively. In a like manner, rotatably displaceable damper members 60, 61 and 62 are included in the conduit segments interconnecting the individual clean gas exit apertures 43, 44 and 45 for each of the filter chambers to the common clean gas exhaust line 46. Under normal filtering flow operation, the dampers 57, 58 and 59 are maintained in closed position and the dampers 60, 61 and 62, are maintained in the open position. Selectively initiated reverse flow cleaning of the permeable filter medium associated with any of the discrete filter chambers is readily effected by manipulation of the pair of dampers associated therewith. For example, cleaning of the filter socks 41 associated with filter chamber 31 is effected by opening damper 58 in the backwash gas inlet conduit 54 and closing damper 61 in the clean gas exit conduit substantially concurrently therewith. The closure of damper 61 effectively interrupts the normal filtering flow through the filter chamber 31 and through the filter socks 41 and the opening of the damper 58 permits backwashing as, at a sufficiently high-pressure differential, to initiate a reverse flow thereof through the filter socks 41, causing the same to belly inward as indicated, and to effect a dislodgement of at least portions of the solid particulate matter that has accumulated either in or on the inner surface thereof during normal filtering flow. While the reverse flow cleaning of the permeable media associated with filter chamber 31 is being effected, normal filtering flow operations continue through the adjacent filter chambers 30 and 32 with a concommitant continuance of the normal downwardly directed flow of gaseous carrier through the longitudinally aligned filter socks, including the filter socks 41, which flow serves to reentrain and downwardly displace the dust that has been dislodged from the socks 41 during the reverse flow cleaning period. Subsequent to a desired period of reverse flow cleaning, the filter chamber 31 is readily returned to normal filtering flow operations by the reopening of the damper member 61 and a substantially concurrent closure of the damper 58 in the clean or backwash gas entry conduit 54. In a similar manner, each of the other discrete filter chambers can be selectively subjected to a reverse flow cleaning operation at any desired time and for any desired duration by mere manipulation of the damper members associated therewith in the manner described above.

As will now be apparent, the continuity of the normal downwardly directed flow of gaseous carrier through all of the longitudinally aligned filter socks during the cleaning operation, save those disposed in the lowermost filter chamber acts to continually direct the particulate matter toward the hopper 19. While the dust dislodged from the filter socks 42 in the lowermost chamber in any assemblage will not normally be subjected to a downwardly directed flow of gaseous carrier during the cleaning process, the resumption of normal flow following the cleaning cycle together with the minimal velocities normally extant therewithin will minimize reentrainment of the dust on the permeable filter media in said lowermost section and will assure disposition of at least appreciable portions thereof within the material receiving hopper A.

FIG. 2 illustrates a dust collector device of essentially the same character as that illustrated in FIG. 1 and described in detail above except that the unit here shown is adapted to employ "pulse-jet" type cleaning techniques. As illustrated, the subject unit includes an upright elongate housing, generally designated 110, upwardly terminating in a cap member 111 which defines, in cooperation with a transversely disposed upper tube sheet 116, an entry or dirty gas plenum chamber 113 into which the gaseous carrier having the particulate matter entrained therein is introduced by the dirty gas entry conduit 115. The lower portion of the housing terminates in a material-receiving hopper 119 having an airlock type valve, generally designated 120, at the dependent end thereof. Disposed immediately above the hopper 119 is a lower tube sheet 125 having a plurality of apertures therein disposed in coaxial alignment with similar apertures 117 in the upper tube sheet 116. Disposed intermediate the upper and lower tube sheets 116 and 125 and in predetermined spaced relation therewith and with each other are one or more transversely disposed intermediate tube sheets, as for example, the tube sheets 128 and 129. Each of the intermediate tube sheets is provided with complemental apertures 133 and 134 disposed in coaxial longitudinal alignment with the apertures in the upper and lower tube sheets. As previously described in detail in conjunction with the structure of FIG. 1, the inclusion of filter socks of permeable media intermediate each adjacent pair of tube sheets, as for example the filter socks 140, 141 and 142 respectively, serves to define a plurality of discrete filter chambers 130, 131 and 132 disposed in vertical superposed relation.

Each of the discrete filter chambers 130, 131 and 132 is provided with a clean gas outlet vent, such as vents 143, 144 and 145, respectively connected to a common clean gas exhaust line 146 through which, for example, gas may be drawn by a downstream fan or other prime mover. In operation of the illustrated unit, the gaseous carrier having the particulate matter entrained therein is introduced into the plenum 113 through the conduit 115 under a driving force which may be provided, for example, by a fan 147, or other prime mover, not shown, disposed downstream in the clear gas exhaust line 146. The dirty gas, i.e., the gaseous carrier together with the entrained particulate matter, is then directed in normal filtering flow through the apertures 117 in the upper tube sheet 116 into the filter socks 140 which serve, in conjunction with the coaxially aligned filter socks 141 and 142, as extensions of the dirty gas conduit system. Under such normal flow conditions a portion of the gaseous carrier will pass through the the walls of each of the respective filter socks 140, 141 and 142 and into and through the filter chambers 130, 131 and 132 respectively, leaving the particular matter entrained therein on the surface of or in the permeable filter media. The cleaned gas will then exit from the respective filter chambers through the next vents 143, 144, 145 and through the conduit sections 167, 168 and 169 interconnecting said exit vents with the common clean air exhaust line 146.

Provision for pulse jet type of cleaning of the permeable filter media is readily effected by including in the clean gas conduit system downstream of each of the clean gas outlet vents 143, 144 and 145 for the filter chambers 130, 131 and 132 respectively, jet pipes such as the pipes 170, 171 and 172. The pipes 170, 171 and 172 are connected to a header 173 constituting a source of high energy cleaning gas through individual quick acting valves 174, 175 and 176, the arrangement being such that there may be released at the ends of the pipes 170, 171 and 172 pulses of high energy gas. In the practice of the invention, the points of release of the pulses, i.e., at the ends of the respective pipes 170, 171 and 172, are positioned to deliver the high energy pulses oppositely to the direction of normal filtering flow of clean gas (whether or not such flow is actually in progress) and entirely across a cross-sectional area of a path of said clean gas flow. In the illustrated apparatus the points of release are located in substantially coaxial alignment with the axes of the conduit segments 167, 168 and 169 downstream of the clean gas exit vents 143, 144 and 145 respectively and are spaced therefrom so as to ensure that the pulse jet issuing from each of said points of release will as they expand in their environment, selectively generate a cone of relatively high energy gas which extends across the entire cross-sectional area of said conduit segments.

As mentioned earlier, the pulse-jet cleaning techniques employable in conjunction with the described apparatus may include single pulse operation as disclosed in Church Reissur U.S. Pat. No. Re. 24,954 or multipulse operation as, for example, of the type disclosed in U.S. Pat. No. 3,368,328 and electrical controls of usual circuitry and solenoid actuated quick operating valve assemblies of conventional nature and not here shown, are includable to operate the valves 714, 175 and 176 in any desired manner to thereby allow the operator to program a release of any desired series of pulses at any of the points of release specified in the individual filter chambers.

Turning now to the preferred practices of the invention within the context of an elongate vertically disposed filter media which is traversed at least in part by a downwardly directed dirty gas stream, experimental results obtained to ate indicate that improved gas handling capacity is obtained when the filter socks are generally progressively subjected, at least in part, to sequenced cleaning operation in the direction of dirty gas flow and marked enhancement in gas handling capacity is obtained when the lower portions of the media are subjected to preferentially greater effective cleaning operations than are the upper portions thereof. Such cleaning operations can be generally of any suitable character and the preferential differentiation between the upper and lower portions of the filter media may be obtained by localized expenditures of greater amounts of cleaning power, localized utilization of different types of cleaning, increased cleaning periods or by any other suitable expedient available in a given installation. For units of the type illustrated herein, the subjection of the filter media forming the conduits generally to sequential cleaning operations in the direction of dirty gas flow, i.e., from top to bottom, and specifically and preferably including a progressive increase in the quanta of effective cleaning in accord with the direction of flow of the dirty gas stream therepast is readily facilitated by the compartmentalized nature of the vertically superposed filter chambers and by the utilization of the pulse-jet cleaning techniques which, for example, conveniently permit the preselection of the number of times that each filter chamber is cleaned in accordance with its relative vertical position intermediate the dirty gas entry plenum and the material receiving hopper as well as facilitate selective variation in the timing and character of the released jets.

Thus, in a unit of the type illustrated in FIG. 2, a suitable sequence of pulse jet cleaning operations would be to first selectively subject the socks 140 to a pulse-jet cleaning operation which would effectively dislodge at least a portion of the particulate matter that had accumulated on or in the permeable media and thereby generally reintroduce the same, oftentimes in partially agglomerated form, into the downwardly moving dirty gas stream. Subsequent thereto and after a predetermined time interval, the socks 141 would be selectively subjected to a pulse-jet cleaning operation which would effectively dislodge at least a portion of the particulate matter that had accumulated on or in the permeable media, including at least a portion of the solids that had been previously dislodge d from the socks 140, and thereby reintroduce the same into the downwardly moving air stream. In a similar manner, the subsequent subjection of the lowermost group of filter socks 142 to a selective pulse-jet cleaning operation will result in a dislodgement of at least a portion of the particulate matter that had accumulated on or in such permeable media to permit a largely gravity induced descent thereof into the hopper 119.

The progressive directional transition or sequencing of the cleaning operations concurrent to the direction of dirty gas flow results probably because of the effective continuity of concurrent displacement of the accumulated particulate matter and gas flow and possible agglomeration of the accumulated particulate matter, in a markedly higher efficiency of cleaning of the media and is reflected in increased gas handling capacity. As noted earlier, however, even further increases in operational efficiency and air handling capacity are obtained when the lowermost portions of the filter media are subjected to preferentially greater cleaning. In initially instituted experimental operations to date on a three chamber unit of the type illustrated in FIG. 2 incorporating 10-foot cotton sateen filter socks in each chamber, talc No. 319 of Whittaker, Clark and Daniels Co. as the particulate matter and applied gas jet cleaning in the gas exit apertures located at the midpoint of each chamber, the following results generally indicate the comparative nature of the results obtained through practice of the above-described methods:

Example A

| | |
|---|---|
| Pressure drop | 3.35 inches of water |
| Dust load | 5.65 grains/cu. ft. |
| High Pressure Air | 90 p.s.i. |

Under the above conditions and utilizing single jet pulses of 0.7 seconds duration in the following sequences: Top chamber (2 min.) — Middle chamber (2 min.) — Bottom chamber (2 min.); a face velocity of 1.67 cubic feet of air per square foot of filter media which is conventionally expressed as feet per minute, was obtained.

Example B

| | |
|---|---|
| Pressure drop | 3.5 inches of water |
| Dust load | 6.13 grains/cu. ft. |
| High Pressure Air | 90 p.s.i. |

Under the above conditions and utilizing single jet pulses of 0.7 seconds duration in the following sequence: Top chamber (2 min.) — Bottom chamber (2 min.) — Middle chamber (2 min.) — Bottom chamber (2 min.); a face velocity of 2.04 feet per minute, was obtained.

Example C

| | |
|---|---|
| Pressure drop | 3.5 inches of water |
| Dust load | 6.13 grains/cu. ft. |
| High Pressure Air | 90 p.s.i. |

Under the above conditions and utilizing a single jet pulse of 0.7 seconds duration in the following sequence: Top chamber (3 sec.) — Middle chamber (3 sec.) — Bottom chamber (6 min.); a face velocity of 2.43 feet per minute was obtained.

Example D

| | |
|---|---|
| Pressure drop | 3.5 inches of water |
| Dust load | 5.92 grains/cu. ft. |
| High pressure gas | 90 p.s.i. |

Under the above conditions and utilizing a single jet pulse of 0.7 seconds duration in the following sequence: Top chamber (4 sec.) — Bottom chamber (3 min.) — Middle chamber (4 sec.) — Bottom chamber (3 min.); a face velocity of 2.27 feet per minute was obtained.

Example E

| | |
|---|---|
| Pressure drop | 3.5 inches of water |
| Dust load | 5.89 grains/cu. ft. |
| High pressure gas | 90 p.s.i. |

Under the above conditions and utilizing a single jet pulse of 0.7 seconds duration in the following sequence: Top chamber (2 min.) — Bottom chamber (2 min.) — Middle chamber (2 min.) — Bottom chamber (2 min.) — Middle chamber (2 min.) — Bottom chamber (2 min.); a face velocity of 2.12 feet per minute was obtained.

As evidenced by the following preliminary data, the utilization of multipulsing techniques apparently provides a further improvement in the results obtained.

Example F

| | |
|---|---|
| Pressure drop | 3.5 inches of water |
| Dust load | 5.89 grains/cu. ft. |
| High pressure air | 90 p.s.i. |

Under the above conditions and utilizing a multipulse formed of 6 pulses of 0.7 seconds duration separated by a 0.1 second interval in the following sequence: Top chamber (4 secs.) — Middle chamber (4 secs.) — Bottom chamber (4 secs.) — Bottom chamber (6 minutes); a face velocity of 2.79 feet per second was obtained.

Example G

The above run was repeated utilizing a multipulse formed of 6 pulses of 0.2 seconds duration separated by a 0.1 second interval; and a face velocity of 2.69 feet per second was obtained.

In accord with the dictates of the patent statues, I have herein disclosed and described the presently preferred embodiments that incorporated the principles of my invention, however it will now be apparent that practice of the invention is not limited to the disclosed embodiments and many variants may occur to those skilled in this art that will differ from that which is disclosed herein but which will be encompassed within the scope of the appended claims.

Having thus described my invention, I CLAIM:

1. Apparatus for separating particulate matter from a gaseous carrier comprising:
    a plurality of discrete filter chambers disposed in adjacent vertical superposed relation, each defined in part by gas impervious and vertically disposed perimetric housing means and transversely disposed and vertically spaced tube sheet means perimetrically connected thereto.
    vertically oriented conduit means of substantially uniform cross-sectional configuration traversing the vertical extent of said superposed filter chambers and constituted at least in part by permeable filter medium disposed within each of said filter chambers,
    said conduit means interconnecting said filter chambers through said tube sheet means and forming a portion of the defining walls thereof,
    each discrete filter chamber having an outlet for the removal of filtered gaseous carrier therefrom, and
    inlet means for introducing said gaseous carrier bearing said particulate matter into one terminal end of said vertically oriented conduit means, whereby said gaseous carrier and particulate matter are directed towards said permeable filter medium and said gaseous carrier passes therethrough and the particulate matter is retained therein.

2. Apparatus as set forth in claim 1 wherein said conduit means constitutes at least one uninterrupted passage having a lineally continuous longitudinal axis.

3. Apparatus as set forth in claim 1 wherein said conduit means comprises a plurality of elongate tubes of permeable filter medium.

4. Apparatus as set forth in claim 1 including:
    means for introducing gaseous carrier and particulate matter entrained therein into the upper end of said conduit means and
    a particulate material-receiving hopper disposed beneath the lower end of said conduit means.

5. Apparatus as set forth in claim 1 including:
    means for introducing gaseous carrier and particulate matter entrained therein into the lower end of said conduit means, and
    a particulate material-receiving hopper disposed beneath the lower end of said conduit means.

6. Apparatus at set forth in claim 1 including:
    means for subjecting the permeable filter medium forming a portion of the defining walls of each said discrete filter chamber to a selective cleaning operation to restore the permeability thereof.

7. Apparatus for separating particulate matter from a gaseous carrier comprising
    a plurality of discrete filter chambers disposed in adjacent vertical superposed relation, each defined in part by gas impervious and vertically disposed perimetric housing means and transversely disposed and vertically spaced tube sheet means perimetrically connected thereto,
    each of said chambers including internally disposed gaseous carrier inlet means formed at least in part of permeable filter medium and a discrete gaseous carrier outlet in each of the perimetric housing means for removal of filtered gas therefrom, and
    vertically oriented conduit means for substantially uniform cross-sectional configuration traversing the vertical extent of said superposed filter chambers and interconnecting said chambers through said tube sheet means and formed at least in part by said permeable filter medium disposed within each of said chambers, and inlet means for introducing said gaseous carrier bearing said particulate matter into one terminal end of said vertically oriented conduit means, whereby said gaseous carrier and particulate matter are directed towards said permeable filter medium and said gaseous carrier passes therethrough and the particulate matter is retained therein.

8. Apparatus as set forth in claim 7 wherein said vertically oriented conduit means comprises interconnected length of filter medium.

9. Apparatus as set forth in claim 7 including:

means for selectively introducing backwashing gas to each of said filter chambers, and damper means for selectively halting normal filter flow through each of said filter chambers and introducing each of said filter chambers and countercurrent to normal filter flow therethrough to effect a reverse flow of said backwashing gas through the permeable filter medium associated with each of said chambers.

10. Apparatus as set forth in claim 7 including:

means associated with the gaseous carrier outlets for each of said filter chambers for directing a momentarily emitted jet of high energy gas over the entire cross-sectional area thereof to stop and reverse the normal flow of gaseous carrier therethrough.

11. Apparatus as set forth in claim 7 wherein said vertically oriented conduit means comprises interconnected lengths of tubular filter medium disposed intermediate and terminally secured in encircling relation to apertures in vertically spaced gas impervious tube sheet means forming, at least in part, the defining walls of each of said filter chambers.

12. Apparatus as set forth in claim 11 including:

means for introducing gaseous carrier and particulate matter entrained therein into the upper end of said conduit means, and a particulate material-receiving hopper disposed beneath the lower ends of said conduit means.

13. Apparatus as set forth in in claim 11 including:

means for introducing gaseous carrier and particulate matter entrained therein into the lower end of said conduit means, and a particulate material-receiving hopper disposed beneath the lower end of said conduit means.

14. Apparatus as set forth in claim 7 including:

means for subjecting the permeable filter medium associated with each said filter chamber to a selective cleaning operation to restore the permeability thereof.

15. Apparatus as set forth in claim 14 including:

means for sequentially operating said last mentioned means in a predetermined succession in which, at least in part, the filter media associated with the uppermost filter chamber is a stack thereof is cleaned prior to the filter media associated with the lowermost chamber in said stack.

16. Apparatus for separating particulate matter from a gaseous carrier comprising:

a plurality of discrete filter chambers disposed in abutting vertical superposed relation, each of said filter chambers defined, at least in part, by gas impervious vertically disposed perimetric housing means and transversely disposed multiapertured tube sheet means disposed in predetermined vertical spaced relation and perimetrically connected thereto, vertically oriented conduit means traversing the vertical extent of said superposed filter chambers and compositely formed of a plurality of length of tubular permeable filter medium disposed intermediate and terminally secured in operative encircling relation to longitudinally coaxially aligned apertures in said tube sheet means for conveying gaseous carrier-borne particulate matter to said filter chambers and comprising gaseous carrier inlet means therefor, each of said discrete filter chambers having an outlet in the perimetric, housing means thereof for removal of filtered gaseous carrier therefrom, means for introducing gaseous carrier and particulate matter entrained therein into the upper end of said conduit means, a particulate material-receiving hopper disposed beneath the lower ends of said conduit means to receive particulate matter separated from said gaseous carrier and directionally displaced down said conduit means, and means for independently subjecting the filter medium associated with each of said filter chambers to a cleaning operation to effect selective dislodgment of accumulated particulate matter therefrom.

17. Apparatus as set forth in claim 16 including means for operating said last mentioned means in preselected and predetermined sequence that is at least in part directionally concurrent to the flow of gaseous carrier through said conduit means.

* * * * *

UNITED STATES PATENT OFFICE
CERTIFICATE OF CORRECTION

Patent No. 3,630,005   Dated December 28, 1971

Inventor(s) Thomas V. Reinauer

It is certified that error appears in the above-identified patent and that said Letters Patent are hereby corrected as shown below:

IN THE SPECIFICATION

Column 1, line 52,   "of", second occurrence, should read -- to --.

Column 1, line 61, delete "of"

Column 3, line 11, change "foot" to -- . Incorporated in the upper tube sheet 16 are a plurality --

Column 5, line 4, change "foot" to -- feet --

Column 5, line 12, change "HOwever" to -- However --

Column 5, line 52, change "sue" to - use --

Column 7, line 26, change "clear" to -- clean --

Column 7, line 69, change "Reissur" to -- Reissue --

Column 7, line 74, change "714" to -- 174 --

Column 8, line 6, change "ate" to -- date --

UNITED STATES PATENT OFFICE
CERTIFICATE OF CORRECTION

Patent No. 3,630,005            Dated December 28, 1971

Inventor(s) Thomas V. Reinauer

It is certified that error appears in the above-identified patent and that said Letters Patent are hereby corrected as shown below:

IN THE CLAIMS

Claim 1, line 7, change "." to -- , --

Claim 9, lines 5 and 6, change "each", second occurrence, to -- said backwashing gas thereto in a direction --

Claim 15, line 5, change "is" to -- in a --

Claim 16, line 12, change "length" to -- lengths --

Signed and sealed this 11th day of July 1972.

(SEAL)
Attest:

EDWARD M. FLETCHER, JR.           ROBERT GOTTSCHALK
Attesting Officer                 Commissioner of Patents